Oct. 6, 1942.                    C. C. LEVY                    2,297,836
                        AUTOMATIC TEMPERATURE REGULATION
                              Filed Feb. 26, 1941
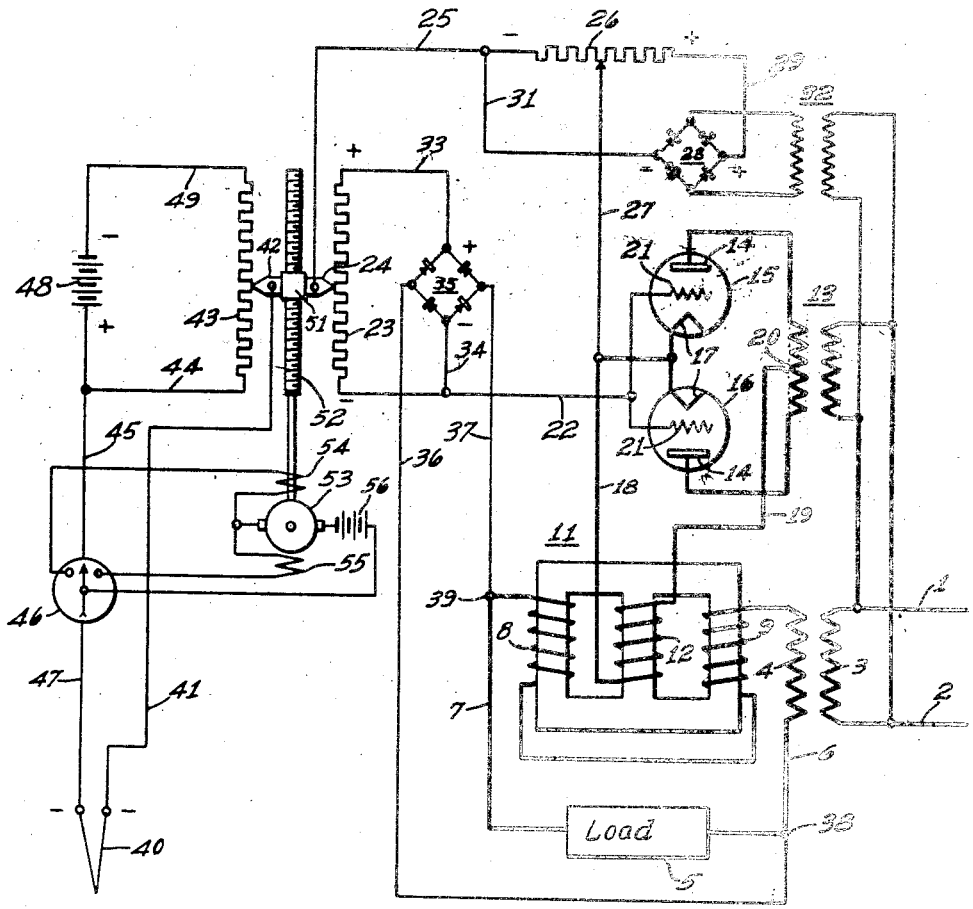
WITNESSES:                                                      INVENTOR
                                                              Cyril C. Levy.
                                                           BY
                                                              Franklin E. Hardy
                                                                  ATTORNEY Patented Oct. 6, 1942

2,297,836

UNITED STATES PATENT OFFICE 2,297,836

AUTOMATIC TEMPERATURE REGULATION

Cyril C. Levy, Pittsburgh, Pa., assignor to Westinghouse Electric & Manufacturing Company, East Pittsburgh, Pa., a corporation of Pennsylvania Application February 26, 1941, Serial No. 380,679

5 Claims. (Cl. 236—78)

This invention relates to automatic temperature regulators for controlling the flow of electric power to heating devices, such as resistor type furnaces, or the like.

It is an object of the invention to provide a variable impedance device in the furnace load circuit and means for controlling said variable impedance device including a control influence that is responsive to the furnace temperature and a control influence that is responsive to an electrical characteristic of the circuit supplying the furnace.

Other objects and advantages of the invention will be apparent from the following description of a preferred embodiment of the invention, reference being had to the accompanying drawing, in which apparatus and circuits illustrating a diagrammatic view of the described embodiment are shown.

Referring to the drawing, an alternating current supply circuit is provided represented by supply conductors 1 and 2 and connected to the primary winding 3 of a power transformer having a secondary winding 4 that is connected to the load element 5 of a furnace. This circuit is traced from winding 4 through conductor 6, load element 5, conductor 7, and windings 8 and 9 of a variable impedance device 11 to the other terminal of the winding 4. The device 11 is shown as a saturable reactor having three winding legs, the two outer legs accommodating the alternating current windings 8 and 9, and the center winding leg accommodating a controlling winding 12 that is supplied with unidirectional energy through a circuit including a transformer 13 and grid controlled rectifier tubes 15 and 16. The primary winding of the transformer 13 is connected to the alternating source conductors 1 and 2, and the opposite ends of the secondary winding of the transformer are connected to anodes 14 of the tube rectifiers 15 and 16. The rectifiers are also provided with cathodes 17 that are connected together and through conductor 18, the winding 12, and conductor 19 to the midpoint 20 of the secondary winding of the transformer 13. The tube rectifiers 15 and 16 are also provided with control grids 21 which are connected together and in a grid control circuit including a conductor 22, a portion of a potentiometer resistor 23, resistor arm 24, conductor 25, a portion of a resistor 26, and conductor 27 to the cathode 17. A dry type rectifier 28 is provided for supplying a unidirectional voltage through conductors 29 and 31 across the resistor 26. The alternating current terminals of the rectifier 28 are connected to the secondary winding of a transformer 32, the primary winding of which is connected to the alternating current supply conductors 1 and 2. The potentiometer resistor 23 is supplied with unidirectional voltage through conductors 33 and 34 from a dry type rectifier 35, the alternating current terminals of which are connected by conductors 36 and 37 to points 38 and 39, respectively, corresponding to the terminals of the load resistor 5.

A control instrument is provided including a thermocouple 40 so located as to be responsive to the temperature of the furnace heated by the load element 5 and connected for supplying a varying potential, depending upon the furnace temperature, to a circuit including conductor 41, rheostat contact element 42, a portion of a potentiometer resistor 43, conductors 44 and 45, galvanometer 46, and conductor 47. A standard battery cell 48 is provided for supplying current through the resistor 43 in the local circuit including conductors 44 and 49.

Means for simultaneously shifting the rheostat contact members 42 and 24 along resistors 43 and 23, respectively, is provided and is here shown as a traveling nut 51 mounted on a threaded shaft 52 that is controlled by a motor having an armature winding 53 and two field windings 54 and 55 through the one or the other of which a circuit may be completed by the galvanometer 46 from a source of energy shown as a battery 56 to effect operation of the motor in the one or the other direction in a well known manner.

If the furnace is in operation and the temperature of the furnace is at its desired value, the voltage developed by the thermocouple 40 will be such that in the above traced circuit from the thermocouple 40 as a source, the voltage between the rheostat contact member 42 and the conductor 44 across the included portion of the resistor 43 will just balance the voltage drop across the same portion of the resistor 43 impressed from the standard battery cell 48 in the local circuit from the battery cell 48 including the entire resistor 43. The two sources 48 and 40 are so connected in circuit that the voltages are in opposition across the portion of the resistor between the contact member 42 and the conductor 44. If now for any reason the temperature of the furnace decreases, the voltage developed by the thermocouple 40 will correspondingly decrease so that there may be a voltage unbalance between the voltage impressed by the thermocouple and that impressed by the cell 48 across the portion of the resistor 43 between the rheostat contact member 42 and conductor 44, causing a current to flow in one direction through the circuit including the galvanometer 46 which will operate to start the motor in a direction to move the contact member 42 in a direction to again effect a voltage balance, that is, in a direction to move the contact member 42 downwardly so as to decrease the voltage between the contact member 42 and the conductor 44 that is impressed in circuit with the galvanometer 46 from the battery 48. With this movement of the contact member 42, the contact member 24 is also moved downwardly as shown in the drawing, thus decreasing the amount of the resistor 23 in the grid control circuit of the tubes 15 and 16 included between the contact member 24 and the negative terminal of the resistor 23. This decrease in the negative bias on the grids 21 causes the tubes 15 and 16 to pass more current through the above traced circuit including the saturating winding 12 of the reactor 11, thus increasing the saturation of the magnetic core and decreasing the reactance of the windings 8 and 9, thus permitting an increase in the current flow from the power transformer source through the load or heating element 5 of the furnace.

As the impedance of the reactor 11 is decreased, and the voltage impressed between the terminals 38 and 39 of the load 5 is increased, this increase in voltage is also applied to the alternating current terminals of the rectifier 35 and a corresponding increase in the unidirectional voltage is impressed across the resistor 23, thus proportionately increasing the negative bias across that portion of the resistor included in the grid circuit of the tubes 15 and 16 between the contact member 42 and the negative terminal of the resistor 23. This action decreases the conductivity of the tubes 15 and 16, thus somewhat decreasing the current flow through the winding 12 and, consequently, slows up the corrective action initiated by the change in the voltage output of the thermocouple 40 to prevent an overcorrection that might otherwise occur and to cause the temperature of the furnace to approach its desired value more gradually.

If, for example, the furnace temperature increases above its desired value, the effect on the thermocouple 41 will cause it to increase its voltage output and thus to effect an unbalance in the two sources 40 and 48 in the opposite direction from that above described so that current will flow in the opposite direction through galvanometer 46 which will effect an operation of the motor armature 53 in a direction to move the contact members 42 and 24 upwardly, as shown in the drawing, and thus to vary the conductivity of the tubes 15 and 16 in a direction to decrease the current flow in the winding 12, thus increasing the reactance of the windings 8 and 9 and decreasing the current flow from the power transformer supply source to the load heating elements 5. In this operation the voltage between the terminals 38 and 39 will be increased, thus increasing the negative bias on the grids 21 of the rectifiers 15 and 16 and again limiting the rate of approach of the temperature of the furnace to its desired value.

Many modifications in the circuits and apparatus illustrated will occur to those skilled in the art within the scope of my invention, and I do not wish to be limited otherwise than by the scope of the appended claims.

I claim as my invention:

1. In a regulator system for controlling the temperature of an electrical device, a load circuit for supplying energy to said electrical device, a variable impedance device in said load circuit for limiting the energy supplied thereto, a control circuit for varying the effective value of said variable impedance device, means including a grid-controlled rectifier for supplying said control circuit, means for varying the grid potential of said rectifier including means for developing a voltage bias that is a measure of the temperature of said electrical device, and means for developing a voltage bias that is a measure of the flow of energy in said load circuit.

2. In a regulator system for controlling the temperature of an electrical device, a load circuit for supplying energy to said electrical device, means for governing the supply of energy to said electrical device including a grid-controlled device, means for varying the grid potential of said grid-controlled device comprising means for applying a voltage bias that is a measure of the temperature of said electrical device in a direction to correct for variations in the temperature of said electrical device from a desired value, and means for applying a voltage bias that varies with the voltage applied to said electrical device in a direction to decrease the rate of correction initiated by the last-named means.

3. In a regulator system for controlling the temperature of an electrical device, a load circuit for supplying energy to said electrical device, a saturable reactor connected in said load circuit and having a control winding, means including a grid-controlled rectifier for supplying unidirectional energy to said control winding, means for varying the grid potential of said rectifier comprising means for applying a voltage bias that is a measure of the temperature of said electrical device in a direction to correct for variations in the temperature of said electrical device from a desired value, and means for applying a voltage bias that varies with the voltage applied to said electrical device in a direction to decrease the rate of correction initiated by the last-named means.

4. In a regulator system for controlling the temperature of an electrical device, a load circuit for supplying energy to said electrical device, a saturable reactor connected in said load circuit and having a control winding, means including a grid-controlled rectifier for supplying unidirectional energy to said control winding, means for varying the grid potential of said rectifier comprising a grid circuit for said rectifier including a portion of a resistor supplied with a unidirectional voltage that is a measure of the voltage across said electrical device, and means responsive to the temperature of said device for controlling the portion of said resistor included in said grid circuit.

5. In a regulator system for controlling the temperature of an electrical device, a load circuit for supplying energy to said electrical device, a variable impedance device in said load circuit for limiting the energy supplied thereto, means including a grid-controlled rectifier for adjusting said variable impedance device for controlling the supply of energy to said electrical device, means for varying the grid potential of said rectifier including means for developing a voltage bias that is a measure of the temperature of said electrical device, and means for developing a voltage bias that is a measure of the flow of energy in said load circuit.

CYRIL C. LEVY.